United States Patent
Stuart et al.

(10) Patent No.: US 10,750,664 B2
(45) Date of Patent: Aug. 25, 2020

(54) DEPTH ADJUSTMENT ASSEMBLY FOR A SEED PLANTING UNIT OF AN AGRICULTURAL IMPLEMENT

(71) Applicant: CNH Industrial Canada, Ltd., Saskatoon (CA)

(72) Inventors: Graham Douglas Stuart, Saskatchewan (CA); Trevor L. Kowalchuk, Saskatchewan (CA); Nicholas George Alfred Ryder, Saskatchewan (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 231 days.

(21) Appl. No.: 15/949,285

(22) Filed: Apr. 10, 2018

(65) Prior Publication Data
US 2019/0307053 A1    Oct. 10, 2019

(51) Int. Cl.
*A01C 7/20* (2006.01)
*A01B 63/00* (2006.01)
*A01B 3/24* (2006.01)
*A01C 5/06* (2006.01)
*A01B 63/22* (2006.01)

(52) U.S. Cl.
CPC .............. *A01C 7/203* (2013.01); *A01B 3/24* (2013.01); *A01B 63/008* (2013.01); *A01B 63/22* (2013.01); *A01C 5/062* (2013.01)

(58) Field of Classification Search
CPC ........ A01C 7/201; A01C 7/203; A01B 63/008
See application file for complete search history.

(56) References Cited

U.S. PATENT DOCUMENTS

| 4,004,667 | A |   | 1/1977  | Vaitys |
| 4,159,050 | A |   | 6/1979  | Hopkins, Sr. et al. |
| 4,860,672 | A | * | 8/1989  | Zimmerman ........ A01B 61/046 111/84 |
| 4,881,421 | A |   | 11/1989 | Schon |
| 4,958,177 | A |   | 9/1990  | Akitake |
| 5,697,455 | A | * | 12/1997 | Deckler ................. A01C 5/062 172/624.5 |
| 5,829,535 | A | * | 11/1998 | Line ...................... A01B 63/26 172/398 |

(Continued)

FOREIGN PATENT DOCUMENTS

CA    2893640 A1 * 12/2016 ............. A01C 7/203
DE    102009015822    4/2011

*Primary Examiner* — Alicia Torres
(74) *Attorney, Agent, or Firm* — Rebecca L. Henkel; Rickard K. DeMille

(57) ABSTRACT

A depth adjustment assembly for seed planting unit of an agricultural implement may include a cam member rotatable to adjust a vertical position of a wheel of the unit relative to a ground engaging tool of the unit. The cam member may include a first engagement element. The depth adjustment assembly may also include a locking member having a second engagement element and a biasing member configured to bias the cam and locking members together to engage the first and second engagement elements and maintain a rotational position of the cam member relative to the locking member. When the first and second engagement elements are disengaged, the cam member is rotatable relative to the locking member to vary the penetration depth setting.

15 Claims, 8 Drawing Sheets

(56) References Cited

U.S. PATENT DOCUMENTS

| | | | |
|---|---|---|---|
| 6,886,641 B2 * | 5/2005 | Ronald | A01B 71/02 |
| | | | 172/134 |
| 8,635,962 B2 * | 1/2014 | Schilling | A01C 7/203 |
| | | | 111/134 |
| 8,863,676 B2 | 10/2014 | Brockmann et al. | |
| 9,151,333 B2 | 10/2015 | Hemphill et al. | |
| 2008/0093093 A1 * | 4/2008 | Sheppard | A01B 61/046 |
| | | | 172/2 |
| 2016/0230820 A1 | 8/2016 | Matthews et al. | |
| 2019/0000004 A1 * | 1/2019 | Sloneker | A01C 5/064 |

\* cited by examiner

DEPTH ADJUSTMENT ASSEMBLY FOR A SEED PLANTING UNIT OF AN AGRICULTURAL IMPLEMENT

FIELD OF THE INVENTION

The present subject matter relates generally to agricultural implements, and more specifically, to a depth adjustment assembly for use within a seed planting unit of an agricultural implement.

BACKGROUND OF THE INVENTION

Generally, agricultural seed planting units are towed behind a tractor or other work vehicle via a mounting bracket secured to a rigid frame of an agricultural implement, such as a planter or seeder. These seed planting units typically include a ground engaging tool or opener that forms a seed planting path for seed deposition into the soil. Specifically, the opener is used to break the soil to enable seed deposition. After the seed is deposited, the opener is followed by a packer wheel that packs the soil on top of the deposited seed. The packer wheel also serves to adjust the penetration depth of the opener within the soil. In certain configurations, the penetration depth of the opener is adjustable by varying a vertical position of the packer wheel relative to the opener.

In typical configurations, the packer wheel is pivotally coupled to a packer support structure by a packer arm. Rotation of the packer arm relative to the packer support structure varies the vertical position of the packer wheel, thereby, in turn, adjusting the penetration depth of the opener. In certain configurations, the packer arm includes a series of openings configured to receive a fastener. The openings are positioned such that the angle of the packer arm relative to the packer support structure may be varied by securing the fastener to a particular opening. However, removing the fastener from one opening, rotating the packer arm relative to the packer support structure, and securing the fastener within another opening is a time consuming process. Furthermore, certain agricultural implements have multiple seed planting units, and therefore have multiple openers (e.g., greater than 50, 60, 70, 80, 90, or more). Because the openers are typically configured to maintain the same penetration depth setting, the duration of the depth adjustment process is multiplied by the number of openers coupled to the implement. Consequently, reconfiguration of the implement for a different penetration depth setting may result in large delays in seeding operations, thereby decreasing seeding efficiency.

Accordingly, an improved depth adjustment assembly for use within an agricultural implement that allows for more efficient reconfiguration of the depth settings of the implement's openers would be welcomed in the technology.

BRIEF DESCRIPTION OF THE INVENTION

Aspects and advantages of the invention will be set forth in part in the following description, or may be obvious from the description, or may be learned through practice of the invention.

In one embodiment, the present subject matter is directed to a depth adjustment assembly for a seed planting unit of an agricultural implement, with the seed planting unit generally including a ground engaging tool configured to penetrate a soil surface, a wheel support arm, and a wheel rotatably supported by the wheel support arm. The wheel may contact the soil surface to define a penetration depth setting for the ground engaging tool relative to the soil surface. The depth adjustment assembly may include a cam member, a locking member, and a biasing member. The cam member may be rotatable to adjust a vertical position of the wheel relative to the ground engaging tool and may include at least one first engagement element. The locking member may include at least one second engagement element configured to be selectively engaged with the at least one first engagement element of the cam member. Additionally, the biasing member may apply a biasing force against at least one of the cam member or the locking member to bias the cam member and locking member together such that the at least one first engagement element engages the at least one second engagement element to maintain a rotational position of the cam member relative to the locking member. When the at least one first engagement element is disengaged from the at least one second engagement element, the cam member may be rotatable relative to the locking member to vary the penetration depth setting for the ground engaging tool.

In another embodiment, the present subject matter is directed to a seed planting unit for an agricultural implement. The seed planting unit may include a support member, a ground engaging tool supported by the support member and configured to penetrate a soil surface, and a wheel support arm pivotally coupled to the support member. The seed planting unit may also include a wheel rotatably supported by the wheel support arm, with the wheel being configured to contact the soil surface to define a penetration depth setting for the ground engaging tool relative to the soil surface. In addition, the seed planting unit may include a depth adjustment assembly. The depth adjustment assembly may include a cam member rotatable to adjust a vertical position of the wheel relative to the ground engaging tool. Moreover, the depth adjustment assembly may also include a locking member and a biasing member. The cam member may include at least one first engagement element and the locking member may include at least one second engagement element, with the biasing member being configured to apply a biasing force against at least one of the cam member or the locking member to bias the cam and locking members together such that the at least one first engagement element engages the at least one second engagement element to maintain a rotational position of the cam member relative to the locking member. When the at least one first engagement element is disengaged from the at least one second engagement element, the cam member may be rotatable relative to the locking member to vary the penetration depth setting for the ground engaging tool.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
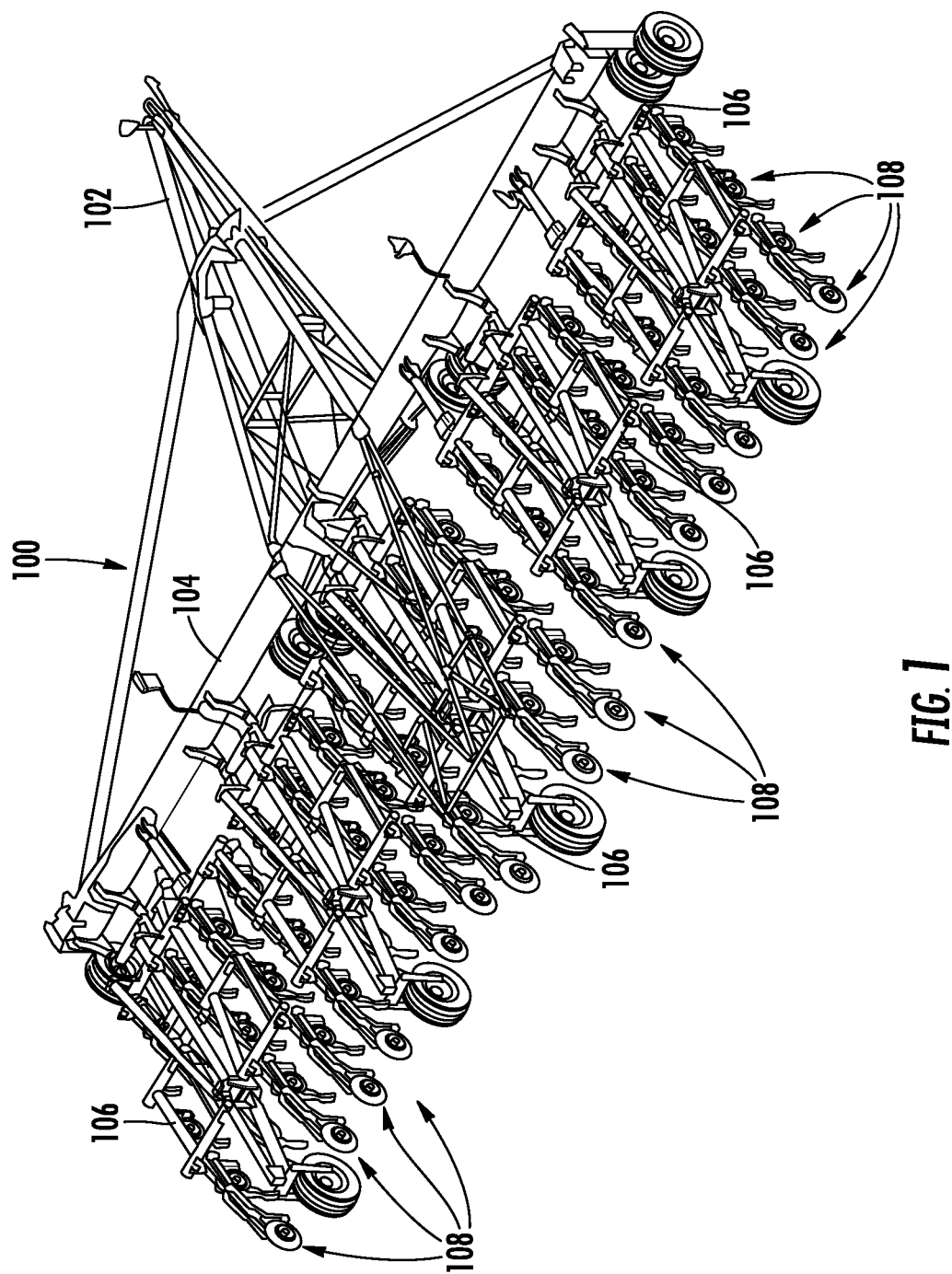
FIG. 1 illustrates a perspective view of one embodiment of an agricultural implement including multiple seed planting units in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a depth adjustment assembly for use within a seed planting unit of an agricultural implement. In several embodiments, the implement may correspond to a planter or seeder and may include a plurality of seed planting units coupled to or otherwise supported by a frame of the planter/seeder. In one embodiment, each seed planting unit may include a ground engaging tool configured to open the soil surface to create a seed trench or furrow, and a wheel rotatably supported by a corresponding wheel support arm of the seed planting unit, with the wheel being configured to roll across or otherwise contact the soil surface to set a penetration depth of the ground engaging tool, as well as to close the seed trench upon deposition of seed therein. Additionally, in accordance with aspects of the present subject matter, each seed planting unit may also include a depth adjustment assembly configured to allow a penetration depth setting for the ground engaging tool to be adjusted. Specifically, the depth adjustment assembly may be configured to adjust the vertical position of the wheel relative to the ground engaging tool, which, in turn, may result in a corresponding adjustment in the penetration depth setting. As such, the depth adjustment assembly may be used to set the desired penetration depth for the ground engaging tool based on, e.g., the soil composition or seed type, to allow for more efficient and/or effective seeding operations.

In several embodiments, the depth adjustment assembly may include a fixed locking member and a rotatable cam member configured to be selectively engaged with the locking member. Additionally, the depth adjustment assembly may include a biasing member configured to bias the cam member towards and into engagement with the locking member. As will be described below, the cam member and the locking member may include mating or corresponding engagement elements, with the engagement elements of the cam member being configured to selectively engage or otherwise interlock with the engagement elements of the locking member based on the axial position of the cam member relative to the locking member. For example, the biasing member may be configured to bias the cam member into a locked axial position at which its engagement elements circumferentially engage the engagement elements of the locking member, thereby allowing the rotational position of the cam member to be located or otherwise maintained relative to the locking member. In such an embodiment, the cam member may be configured to be moved axially away from the locking member against the bias of the biasing member to an unlocked axial position at which the cam member is allowed to rotate relative to the locking member (e.g., to adjust the penetration depth setting of the associated ground engaging tool). Moreover, in one embodiment, the engagement elements of both the cam member and the locking member may be circumferentially spaced apart from one another to allow the cam member to be locked relative to the locking member in discrete angular increments, thereby permitting the penetration depth setting for the ground engaging tool to be similarly adjusted in incremental amounts corresponding to the circumferential offset between adjacent engagement elements.

Additionally, in several embodiments, the cam member may include a cam surface defining a cam profile. In accordance with aspects of the present subject matter, a portion of the wheel support arm may be configured to be supported by or otherwise contact the cam surface such that, as the cam member is rotated relative to the locking member, the portion of the wheel support arm contacting the outer cam surface follows the cam profile, thereby adjusting the vertical position of the wheel relative to the ground engaging tool and, thus, adjusting the associated penetration depth setting of the ground engaging tool.

Further, as will be described below, the specific configuration of the engagement elements of the cam member and the locking member may, in several embodiments, serve to limit the rotation of the cam member relative to the locking member in one or more directions depending on the relative axial position of the cam member. For instance, in one embodiment, the engagement elements may be oriented relative to one another such that the engagement elements of the cam member must be spaced apart axially from the engagement elements of the locking member to allow the cam member to be rotated relative to the locking member in either direction to adjust the penetration depth setting of the ground engaging tool. In another embodiment, the engagement elements may be oriented relative to one another such that, when the engagement elements of the cam member axially abut against the engagement elements of the locking member, the cam member may be rotated in one direction relative to the locking member while being restrained from rotation relative to the locking member in the other direction. Thus, in accordance with aspects of the present subject matter, the specific configuration of the engagement elements may be selected, as desired, to reduce the axial force required to alter the rotational position of the cam member relative to the locking member and/or to prevent accidental rotation of the cam member relative to the locking member in one or more directions.

Referring now to the drawings, FIG. 1 illustrates a perspective view of one embodiment of an agricultural implement 100. In general, the implement 100 is configured to be towed behind a work vehicle, such as a tractor (not shown). As shown in FIG. 1, the implement 100 may include a tow bar assembly 102, which is shown in the form of an A-frame hitch assembly. The tow bar assembly 102 may include a hitch configured to attach to an appropriate tractor hitch via a ball, clevis, or other coupling. Additionally, the tow bar assembly 102 may be coupled to a tool bar 104, which, in turn, supports multiple tool frames 106. Moreover, in several embodiments, each tool frame 106 may include multiple seed planting units 108, such as a plurality of hoe openers. As discussed in detail below, in accordance with aspects of the present subject matter, each seed planting unit 108 may include a depth adjustment assembly configured to facilitate quick and efficient reconfiguration of the associated seed planting unit 108 for varying penetration depth settings.

It should be appreciated that the configuration of the implement 100 described above and shown in FIG. 1 is provided only to place the present subject matter in an exemplary field of use. Thus, it should be appreciated that the present subject matter may be readily adaptable to any manner of implement configuration.

Figure 2:
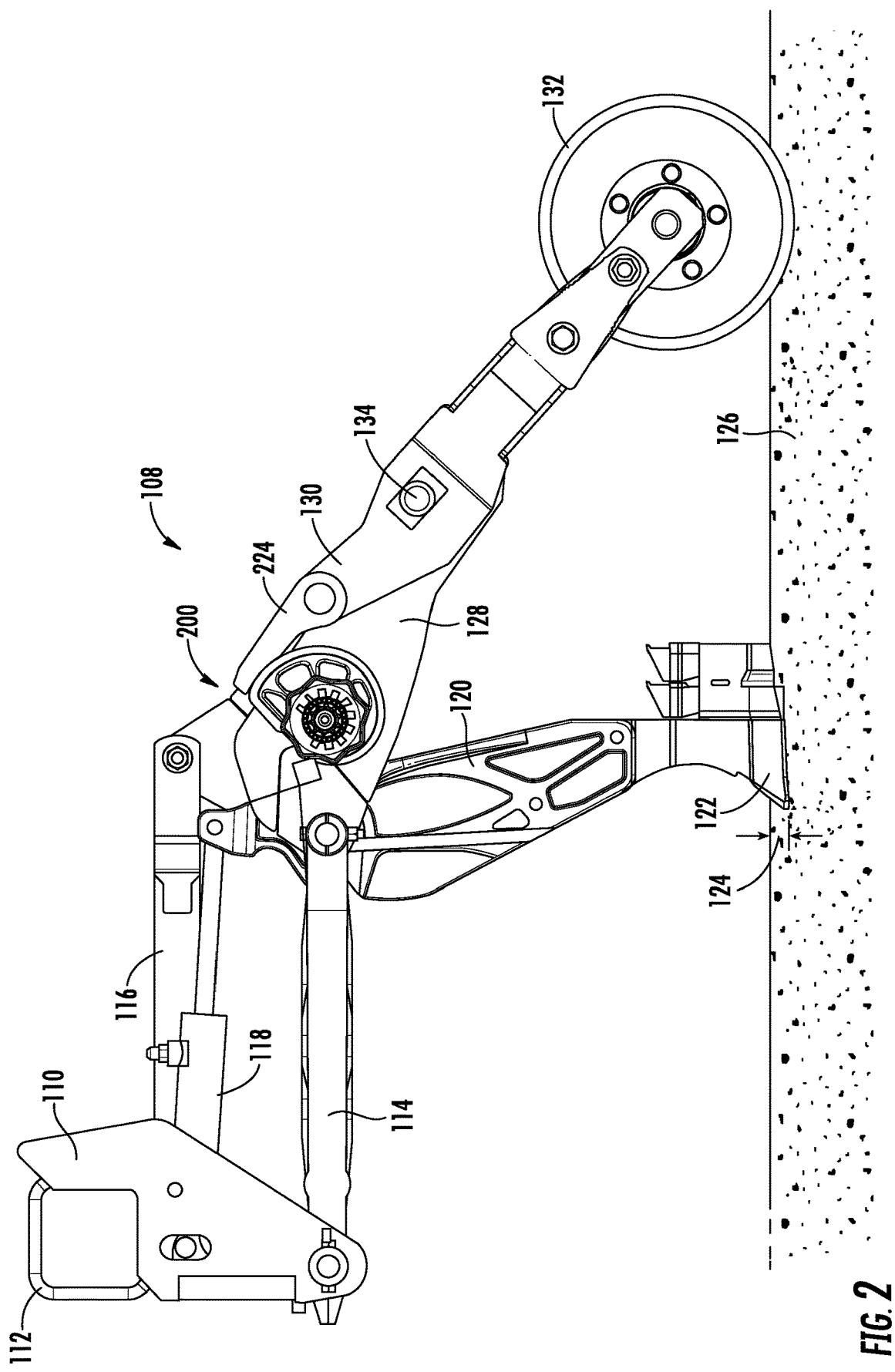
FIG. 2 illustrates a side view of one embodiment of a seed planting unit suitable for use within the agricultural implement shown in FIG. 1 in accordance with aspects of the present subject matter, particularly illustrating the seed planting unit including a support member, a ground engaging tool, a wheel support arm, a wheel, and a depth adjustment assembly.

Referring now to FIG. 2, a side view of one embodiment of a seed planting unit 108 suitable for use within an agricultural implement (e.g., the implement 100 shown in FIG. 1) is illustrated in accordance with aspects of the present subject matter, particularly illustrating the unit 108 including a depth adjustment assembly configured to facilitate reconfiguration of the unit's penetration depth setting. It should be appreciated that, although the seed planting unit 108 is shown and described herein as corresponding to a hoe opener, the seed planting unit 108 may generally correspond to any suitable row unit having any suitable configuration that facilitates the deposition of seeds within the soil. Additionally, it should be appreciated that, although the seed planting unit 108 will generally be described in the context of the implement 100 shown in FIG. 1, the unit 108 may generally be configured to be installed on any suitable implement having any suitable implement configuration.

As shown in FIG. 2, the seed planting unit 108 includes a mounting bracket 110 (and associated hardware 112), a first linkage member 114, a second linkage member 116, and a biasing device or actuator, such as a cylinder 118 (e.g., hydraulic and/or pneumatic piston-cylinder assembly). In one embodiment, the cylinder 118 may be hydraulically coupled to a power supply that provides a flow of pressurized hydraulic fluid which displaces a piston rod extending from the cylinder. The mounting bracket 110 and associated hardware 112 are generally configured to interface with the tool frame 106 (FIG. 1), thereby securing the seeding planting unit 108 to the implement 100 (FIG. 1). For instance, multiple seed planting units 108 may be mounted in parallel along the tool frame 106 (FIG. 1) to form a seeding assembly or unit. In the illustrated embodiment, the first linkage member 114, the second linkage member 116, and the mounting bracket 110 generally form elements of a parallel linkage, also known as a four bar linkage. As will be appreciated, components of the seed planting unit 108, such as the mounting bracket 110 (and associated hardware), first linkage member 114, and second linkage member 116, may be made of any suitable material, such as steel.

As shown in FIG. 2, the cylinder 118 may be attached to a shank 120 via a pin at the end of the piston rod. A ground engaging tool, such as the illustrated opener 122, is also attached to the shank 120 and is configured to engage the soil. Contact force between the opener 122 and the soil establishes a moment about a shank pivot joint. This moment is resisted by the force applied to the shank 120 by the cylinder 118. Furthermore, the linkage is configured to facilitate vertical movement of the implement 100, while maintaining the opener 122 at a desired penetration depth setting 124 within the soil 126. The desired penetration depth setting 124 may be selected based on soil conditions, or environmental factors, among other considerations. As illustrated, the linkage is coupled to a wheel support structure, such as the illustrated support structure 128.

A wheel support arm 130, including a packer wheel 132, is pivotally coupled to the support structure 128. The packer wheel 132 rolls along or otherwise contacts the soil surface to both pack the soil on top of deposited seeds and limit the penetration depth setting 124 of the opener 122. As illustrated, a pin 134 disposed through openings within the wheel support arm 130 and the support structure 128 enables rotation of the wheel support arm 130 with respect to the support structure 128. However, in a working mode, rotation of the wheel support arm 130 relative to the support structure 128 is blocked by a depth adjustment assembly 200 of the seed planting unit 108. As discussed in detail below, the depth adjustment assembly 200 includes a cam member configured to be rotated relative to an associated locking member when it is desired to adjust the penetration depth setting 124 of the opener 122. Specifically, the cam member may be configured to define a cam profile along which a portion of the wheel support arm 130 contacts or otherwise follows with rotation of the cam member. As such, rotation of the cam member relative to the locking member of the depth adjustment assembly 200 may result in the portion of the wheel support arm contacting the cam member being raised or lowered relative to the rotational axis of the cam member, which, in turn, varies the vertical positioning of the opener 122 relative to the packer wheel 132, thereby altering the penetration depth setting 124 of the opener 122. Once a desired penetration depth setting 124 has been established, the cam member may be locked into position relative to the locking member, thereby limiting rotation of the wheel support arm 130 and enabling the seed planting unit 108 to enter the working mode. As previously discussed, the packer wheel 132 rotates across a surface of the soil to limit the penetration depth setting 124 of the opener 122. Consequently, the difference in vertical position between the packer wheel 132 and the opener 122 defines the penetration depth setting 124 of the opener 122 within the soil 126.

Figure 3:
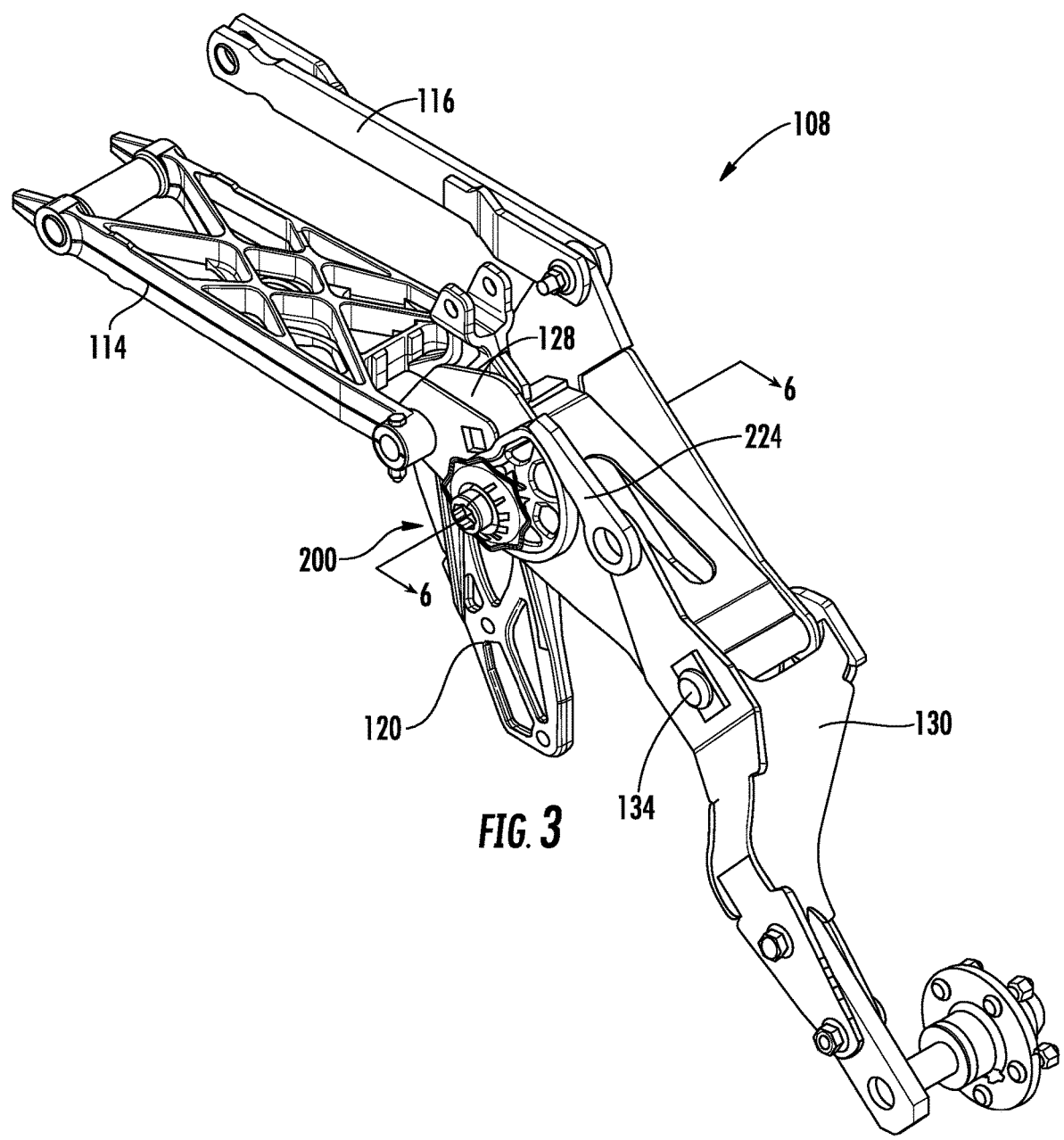
FIG. 3 illustrates a perspective view of the seed planting unit shown in FIG. 2 with various components of the unit, including the packer wheel and a portion of the ground engaging tool, removed for purposes of illustration, particularly illustrating aspects of the support member, the wheel support arm, and the depth adjustment assembly of the seed planting unit in accordance with aspects of the present subject matter.
Figure 4:
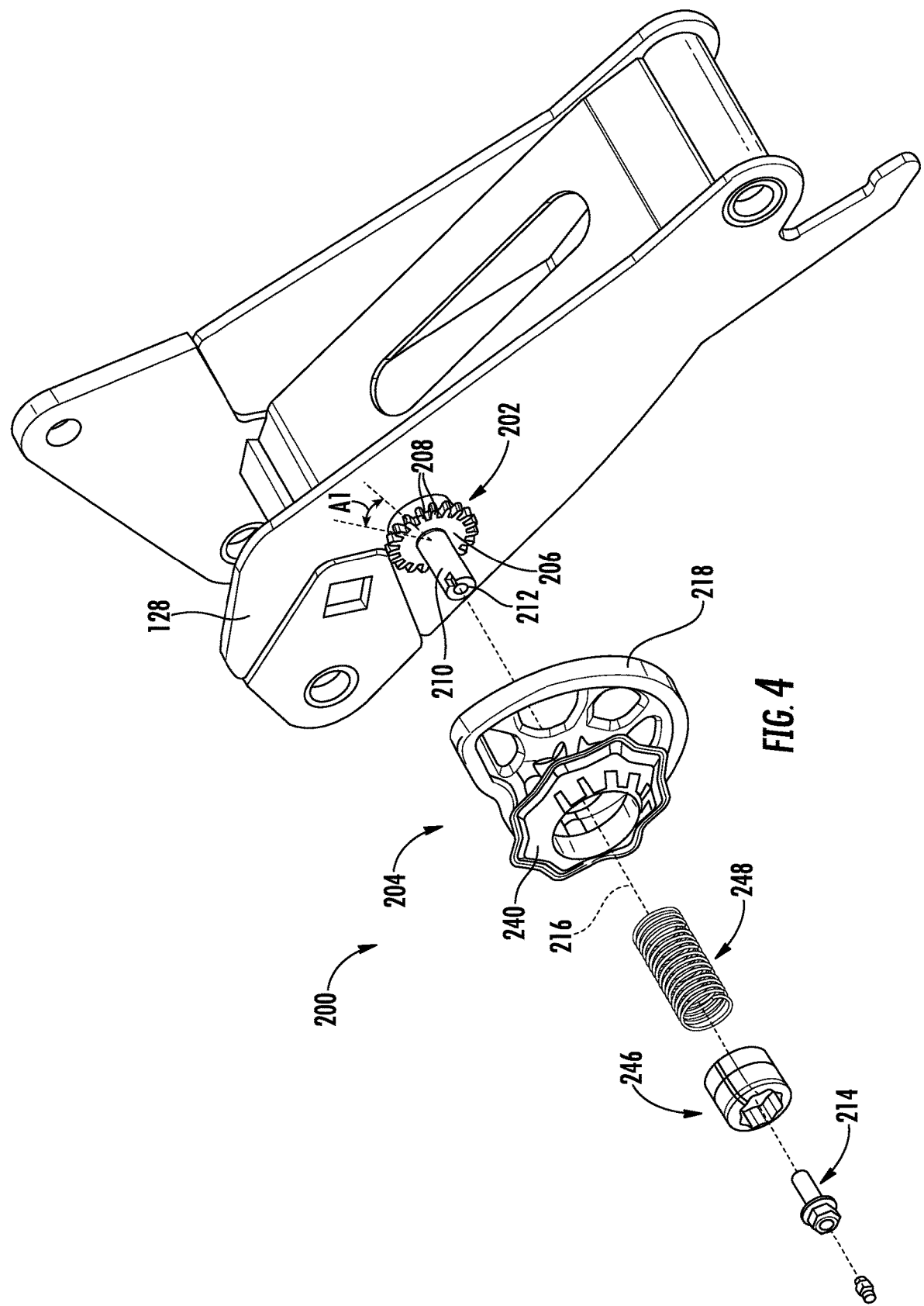
FIG. 4 illustrates a perspective view of the support member and the depth adjustment assembly of the seed planting unit shown in FIG. 3 in accordance with aspects of the present subject matter, particularly illustrating a portion of the depth adjustment assembly exploded away from the support member for purposes of illustration.
Figure 5:
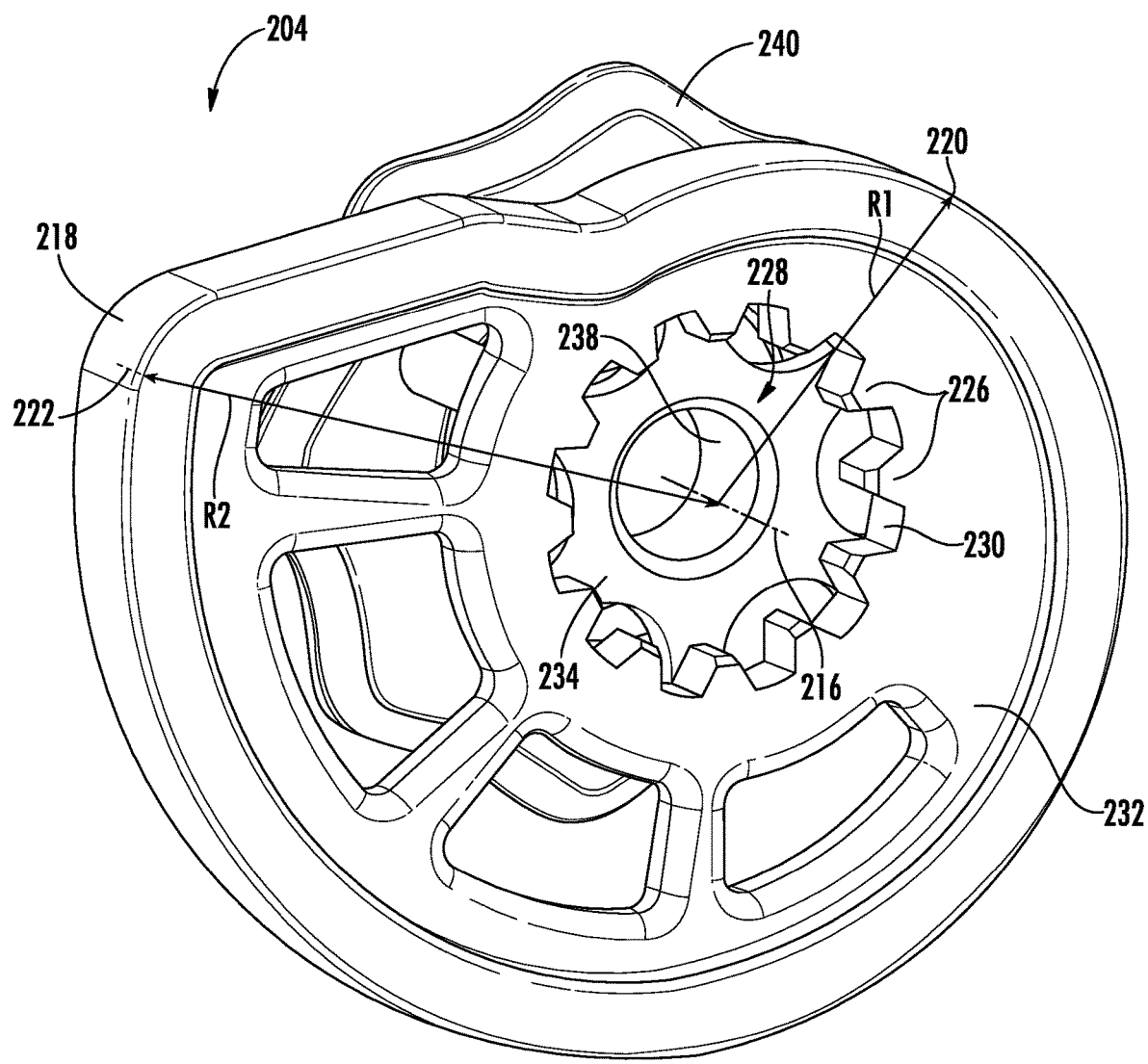
FIG. 5 illustrates a perspective view of a cam member of the embodiment of the depth adjustment assembly shown in FIGS. 2-4 in accordance with aspects of the present subject matter, particularly illustrating the opposite side of the cam member as that shown in FIG. 4.
Figure 6:
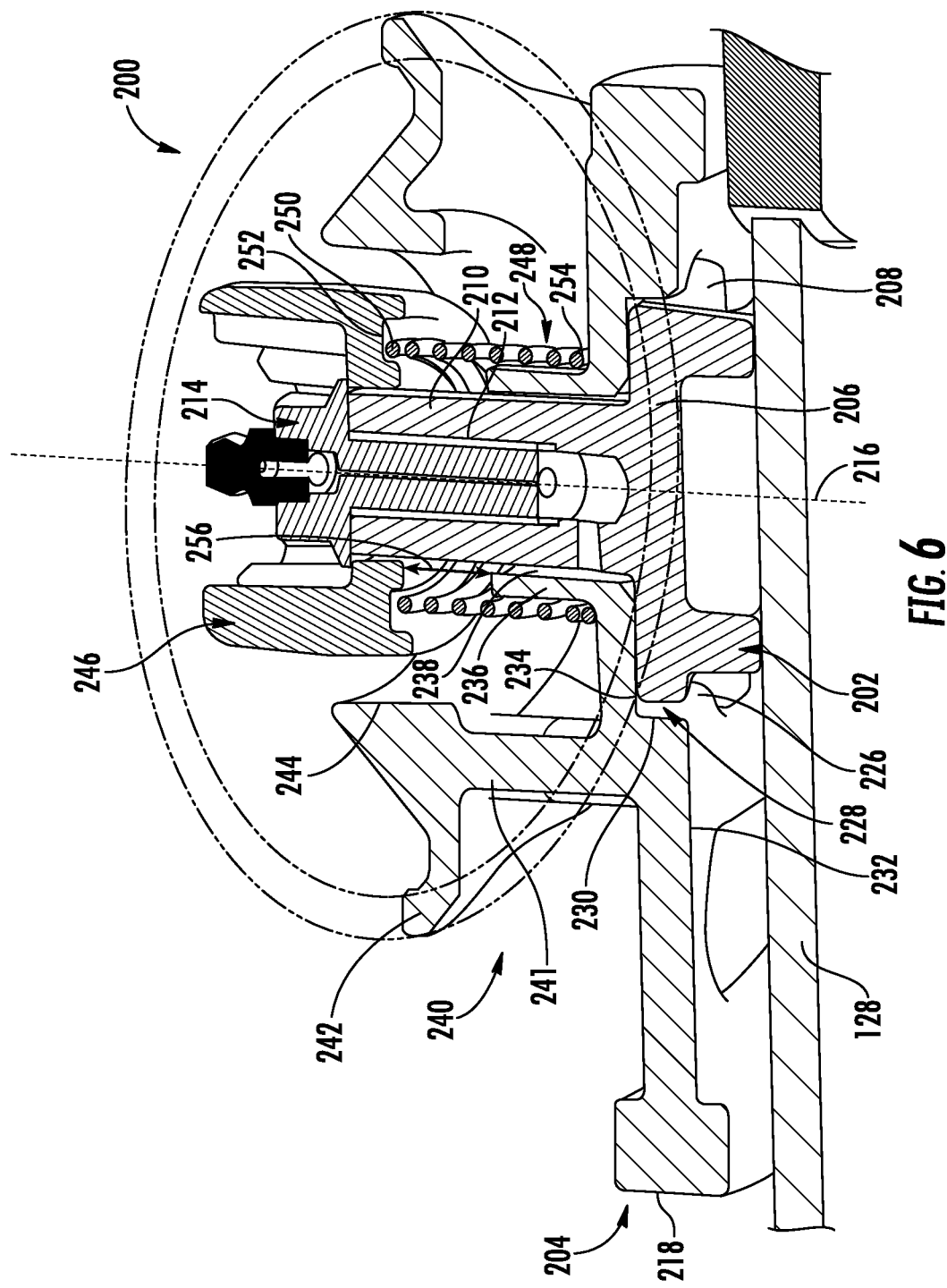
FIG. 6 illustrates a partial perspective, cross-sectional view of the depth adjustment assembly as installed relative to the support member of the seed planting unit shown in FIG. 3 taken about line 6-6 in accordance with aspects of the present subject matter, particularly illustrating the cam member of the depth adjustment assembly disposed at a locked axial position relative to a locking member of the depth adjustment assembly in order to lock or otherwise maintain the rotational position of the cam member relative to the locking member.

Referring now to FIGS. 3-6, various views of one embodiment of a depth adjustment assembly 200 suitable for use within a seed planting unit (e.g., the unit 108 shown in FIG. 2) are illustrated in accordance with aspects of the present subject matter. Specifically, FIG. 3 illustrates a perspective view of the depth adjustment assembly 200 installed relative to the seed planting unit 108 described above with reference to FIG. 2, particularly depicting various components of the unit 108 (e.g., the opener 122 and the packer wheel 132) removed from the drawing for purposes of illustration. FIG. 4 illustrates a perspective view of the support structure 128 and the depth adjustment assembly 200 shown in FIG. 3, particularly illustrating portions of the depth adjustment assembly 200 exploded away from the support structure 128. FIG. 5 illustrates a perspective view of a cam member of the depth adjustment assembly 200 shown in FIGS. 3 and 4, particularly illustrating a view of the cam member from the opposite side as that shown in FIGS. 3 and 4. Additionally, FIG. 6 illustrates a partial perspective, cross-sectional view of the depth adjustment assembly 200 shown in FIG. 3 taken about line 6-6.

In general, as shown in FIGS. 3-6, the depth adjustment assembly 200 may generally include a locking member 202 and a cam member 204. As previously discussed, rotation of the cam member 204 relative to the locking member 202 may result in the portion of the wheel support arm 130 (FIG. 3) contacting the cam member 204 being raised or lowered relative to the rotational axis of the cam member 204, which, in turn, varies the vertical positioning of the opener 122 (FIG. 2) relative to the packer wheel 132 (FIG. 2) and, thus, adjusts the penetration depth setting 124 of the opener 122. Additionally, as will be described in greater detail below, the cam member 204 may be configured to be selectively engaged with or otherwise locked relative to the locking member 202 to prevent further relative rotation of the cam member 202, thereby setting the desired penetration depth for the opener 122. In this regard, the selective engagement between the cam member 204 and the locking member 202 may be based, at least in part, on the relative axial position defined between cam member 204 and the locking member 204. For example, as will be described below, the cam member 204 may be configured to be moved axially relative to the locking member 204 between a first axial position (e.g., an unlocked position) at which the cam member 204 may be freely rotated relative to the locking member 202 to adjust the penetration depth setting 124 of the opener 122, and a second axial position (e.g., a locked position), at which the cam member 204 is prevented from rotating relative to the locking member 202.

As shown in FIGS. 3 and 4, in several embodiments, the depth adjustment assembly 200 may be configured to be installed relative to or otherwise supported by the support structure 128 of the seed planting unit 108. For example, as particularly shown in FIG. 4, the locking member 202 may be configured to be rigidly coupled or otherwise fixed to a side of the support structure 128 so as to extend axially outwardly therefrom. The cam member 204 may then be installed relative to the locking member 202 to allow the cam member 204 to be rotationally supported relative to both the locking member 202 and the support structure 128.

As particularly shown in FIGS. 4 and 6, the locking member 202 may generally include a base portion 206 configured to be rigidly coupled to the support structure 128, such as by coupling the base portion 206 to the support structure 128 via welding or by using mechanical fasteners. Additionally, in several embodiments, the locking member 202 may include one or more locking or engagement elements, such one or more engagement elements 208 extending radially outwardly from the base portion 206 of the locking member 202. As shown in the illustrated embodiment, the radially outwardly extending engagement element(s) 208 correspond to a plurality of locking or engagement teeth spaced apart circumferentially from one another around the outer circumference of the base portion 206. As shown in FIG. 4, a circumferential offset A1 may be defined between adjacent pairs of the locking teeth 208. As will be described below, this circumferential offset A1 may correspond or correlate to an incremental adjustment of the penetration depth setting 124 of the opener 122 as the cam member 204 is being selectively rotated relative to the locking member 202. It should be appreciated that, while the engagement teeth 208 of the locking member 202 are shown as being evenly spaced apart by a specific circumferential offset A1, the teeth 208 may generally be spaced apart from one another by any suitable incremental amount. Additionally, as particularly shown in FIGS. 4 and 6, the locking member 202 may also include an axially extending post 210 that projects axially outwardly from the base portion 206. As will be described below, in one embodiment, the post 210 may define a threaded opening 212 configured to receive a fastener 214 when installing the depth adjustment assembly 200 relative to the support structure 128.

As indicated above, the cam member 204 of the depth adjustment assembly 200 may be configured to be installed relative to the locking member 202 such that the cam member 204 is selectively rotatable relative to the locking member about a central rotational axis 216 (FIGS. 4 and 6). For example, in one embodiment, the axially extending post 210 may be configured to extend coaxially with the central rotational axis 216, with the cam member 204 configured to be received onto the post 210 to allow the cam member 204 to be rotated relative to the locking member 202 about the rotational axis 216. As will be described further below, the cam member 204 may also include locking or engagement features that are configured to engage or otherwise interlock with the engagement features of the locking member 202 (e.g., the engagement teeth 208) to allow the rotational orientation or position of the cam member 204 to be locked or otherwise maintained relative to the locking member 202.

Referring specifically to FIG. 5, the cam member 204 may generally include an outer cam surface 218 defining a cam profile, such as a non-circular cam profile. Specifically, in several embodiments, the outer cam surface 218 may be spaced apart radially from the rotational axis 216 of the cam member 204 such that a radial distance defined between the outer cam surface 218 and the rotational axis 216 varies around the outer perimeter of the cam profile. For example, as shown in FIG. 5, the outer cam surface 218 may be spaced apart from the rotational axis 216 at a first end 220 of the cam profile by a first radial distance R1 and may be spaced apart from the rotational axis 216 at an opposed second end 222 of the cam profile by a second radial distance R2, with the second radial distance R2 being greater than the first radial distance R1. In such an embodiment, the radial spacing defined between the cam surface 218 and the rotational axis 216 may generally increase as the cam surface 218 extends between the first and second ends 220, 222 of the cam profile.

As indicated above with reference to FIG. 2, a portion of the wheel support arm 130 may be configured to contact or otherwise follow the outer cam surface 218 as the cam member 204 is being rotated relative to the locking member 202. For example, as shown in FIGS. 2 and 3, the wheel support arm 130 may include an abutment portion 224 positioned at the end of the support arm 130 opposite the end at which the packer wheel 132 is supported (as shown in FIG. 2). In such an embodiment, the abutment portion 224 of the support arm 130 may be configured to be supported on top of the cam member 204 such that the vertical positioning of the abutment portion 224 (and, thus, the relative vertical positioning of the wheel packer 132) varies with rotation of the cam member 204. For example, as the cam member 204 is rotated relative to the locking member 202 in one direction such that radial spacing defined between the rotational axis 216 of the cam member 204 and the portion of the outer cam surface 218 on which the abutment portion 224 is supported decreases, the abutment portion 224 may pivot downwardly closer to the rotational axis 216 about the pivot point defined by pin 134, thereby causing the opposed end of the support arm 130 to pivot upwardly, which, in turn, raises the packer wheel 132 relative to the opener 122 and, thus, increases the penetration depth setting 124 for the opener 122. Similarly, as the cam member 204 is rotated relative to the locking member 202 in the opposite direction such that radial spacing defined between the rotational axis 216 of the cam member 204 and the portion of the outer cam surface 218 on which the abutment portion 224 is supported increases, the abutment portion 224 may pivot upwardly away from the rotational axis 216 about the pivot point defined by the pin 134, thereby causing the opposed end of the support arm 130 to pivot downwardly, which, in turn, lowers the packer wheel 132 relative to the opener 122 and, thus, decreases the penetration depth setting 124 for the opener 122. Accordingly, by rotating the cam member 204 relative to the locking member 202, the abutment portion 224 may be moved further or closer to the rotational axis 216 of the cam member 204, thus, pivoting the wheel support arm 130 about the pin 134 to adjust the vertical positioning of the packer wheel 132 relative to the opener 122 in a manner that varies the associated penetration depth setting 124.

As indicated above, to allow the rotational position of the cam member 204 relative to the locking member 202 to be fixed (and, thus, to fix the associated penetration depth setting 124 for the opener 122), the cam member 204 may include one or more engagement elements 226 configured to be provided in interlocking engagement with the corresponding engagement elements 208 of the locking member 202. Specifically, in several embodiments, the cam member 204 may include a plurality of radially inwardly extending engagement elements, such as radially inwardly extending engagement teeth 226, configured to engage or mesh with the corresponding radially inwardly extending engagement teeth 208 of the locking member 202. For example, as shown in FIG. 5, the engagement teeth 226 may be configured to extend within an axial inset portion 228 of the cam member 204, where the axial inset portion 228 forms a substantially cylindrical surface 230 recessed within the cam member 204 that extends axially from a bottom surface 232 of the cam member 204 to an axially inset wall 234. In such an embodiment, the engagement teeth 226 of the cam member 204 may be configured to extend radially inwardly from the cylindrical surface 230 of the axial inset portion 228. Additionally, in one embodiment, the engagement teeth 226 of the cam member 204 may be configured to be spaced circumferentially apart from one another by a circumferential offset that generally corresponds to the circumferential offset defined between adjacent pairs of the engagement teeth 208 of the locking member 202 (e.g., by the circumferential offset A1). Thus, as will be described below, the engagement teeth 226 of the cam member 204 may be configured to interlock with or otherwise circumferentially engage the corresponding engagement teeth 208 of the locking member 202 when the cam member 204 is biased into engagement with the locking member 202, thereby fixing the rotational position of the cam member 204 relative the locking member 202.

Moreover, as particularly shown in FIG. 6, the cam member 204 may also include an axially extending cylindrical portion 236 having a hollow configuration so as to define a bore 238 extending therethrough. In such an embodiment, the axially extending post 210 of the locking member 202 may be configured to be received within and extend through the bore 238 along the rotational axis 216 of the cam member 204. In addition, in one embodiment, the axially extending cylindrical portion 236 may be radially encircled by a handle 240 of the cam member 204, with the handle 240 including an axially extending cylindrical wall 241 having a radially outwardly extending circumferential flange 242 forming a graspable portion of the handle 240. As shown in FIG. 6, the handle 240 may be spaced apart radially from the axially extending cylindrical portion 236 so as to at least partially define a cavity 244 within the cam member 204.

Moreover, as particularly shown in FIGS. 4 and 6, in addition to the locking member 202 and the cam member 204, the depth adjustment assembly 200 may further include a cap or holding member 246 and a biasing member (e.g., spring 248) configured to be compressed between the holding member 246 and the cam member 204. As shown in the illustrated embodiment, spring 248 may be configured to be positioned within the cavity 244 defined by the cam member 204 such that the spring 248 encircles the axially extending post 210 of the locking member 202. In such an embodiment, the holding member 246 may then be installed within the cavity 244 and onto the post 210 such that the spring 248 is captured and compressed between the holding member 246 and the cam member 204. The fastener 214 may then be threaded into the threaded opening 212 defined by axially extending post 210 to retain the holding member 246 within the cavity 244. For example, as particularly shown in FIG. 6, an outer diameter of the head of the fastener 214 may larger than the diameter of the post 210 such that the fastener head extends radially outwardly beyond the post 210 and engages a portion of the holding member 246. As such, the fastener head may serve as an axial stop for the holding member 246 as the spring 248 is compressed between the holding member 246 and the cam member 204. Given such a configuration, the spring 248 may be configured to apply a biasing force against the cam member 204 that biases the cam member 204 towards and into engagement with the locking member 202. It should be appreciated that, in other embodiments, the spring 248 may be replaced with any other suitable biasing member configured to bias the cam member 204 into engagement with the locking member 202.

As indicated above, the spring 248 of the depth adjustment assembly 200 may be captured within the cavity 244 defined by the cam handle 240 between the holding member 246 and the cam member 204. For example, as shown in FIG. 6, the spring 248 may extend axially within the cavity 244 such that a first axial end 250 of the spring 248 is at least partially received within an annular groove 252 of the holding member 246 while a second axial end 254 of the spring abuts against the cam member 204. As such, the compressed spring 248 may provide a bilateral force that serves to bias the holding member 246 against the fastener 214 and while biasing the cam member 204 towards the locking member 202. In this regard, to move the cam member 204 axially away from the locking member 202, the biasing force of the spring 248 must be overcome by compressing the spring 248 between its axial ends 250, 254.

Moreover, in the illustrated embodiment, the extent to which the cam member 204 may be moved axially against the biasing force of the spring 248 may be limited by an axial distance 256 defined between the end of the axially extending cylindrical portion 236 of the cam member 204 and the holding member 246. In other words, the cam member 204 may only be moved axially away from the locking member 202 until the axially extending cylindrical portion 236 abuts the holding member 246. In such an embodiment, the axial distance 256 may generally be selected to allow the cam member 204 to be moved axially relative to the locking member 202 between a locked axial position, at which the engagement teeth 208, 226 of the locking and cam members 202, 204 axially overlap one another (thereby allowing the engagement teeth 208, 203 to circumferentially engage one another), and an unlocked axial position, at which the engagement teeth 226 of the cam member 204 are spaced axially apart from the engagement teeth 208 of the locking member 202 (thereby allowing the cam member 204 to be rotated relative to the locking member 202). For example, the axial distance 256 may correspond to a distance that is greater than the axial overlap defined between the engagement teeth 208, 226 of the locking and cam members 202, 204 when the cam member 204 is located at its locked axial position.

For example, FIG. 6 illustrates the cam member 204 disposed at its locked axial position relative to the locking member 202. As shown, at such axial position, the cam member 204 is configured to axially abut against the locking member 202 such that each engagement tooth 226 of the cam member 204 is received between an adjacent pair of engagement teeth 208 of the locking member 202, thereby preventing rotation of the cam member 204 relative to the locking member 202. Specifically, as the cam member 204 is moved towards the locking member 202 into its locked axial position, the base portion 206 of the locking member 202 may be configured to be at least partially received within the axial inset portion 228 of the cam member 204, thereby allowing the engagement teeth 208, 226 of the locking and cam members 202, 204 to engage one another and, thus, lock the rotational position of the cam member 204 relative to the locking member 202. Thereafter, when it is desired to adjust the penetration depth setting 124 of the opener 122, the cam member 204 may be moved axially away from the locking member 202 against the biasing force of the spring 248 (e.g., by the operator grasping the handle 240 and pulling the cam member 204 away from the locking member 202) until the cam member 204 is disposed at its unlocked axial position relative to the locking member 202 (i.e., until the engagement teeth 226 of the cam member 204 axially clear the engagement teeth 208 of the locking member 202). At this unlocked axial position, the cam member 204 may be rotated relative to the locking member 202 (e.g., by the operator applying a torque to the handle 240) to adjust the rotational position of the cam member 204, which, in turn, adjusts the depth penetration setting 124 of the opener 122. For example, by rotating the cam member 204 relative to the locking member 202 by an incremental angular amount corresponding to the circumferential offset A1 defined between adjacent engagement teeth 208, 226, the depth penetration setting 124 may be adjusted by a corresponding incremental amount. Thus, the granularity of the adjustments of the depth penetration setting 124 may generally be set by the circumferential offset A1 of the engagement teeth 208, 226, with a smaller offset A1 allowing for finer or more granular adjustments to be made to the penetration depth setting 124. Once the cam member 204 has been rotated to a given rotational position relative to the locking member 202 corresponding to the desired penetration depth setting 124 for the opener 122, the cam member 204 may be released (e.g., by the operator releasing the handle 240) to allow the cam member 204 to be biased back into its locked axial position such that the engagement teeth 226 of the cam member 204 are again circumferentially engaged with the corresponding engagement teeth 208 of the locking member 202. In the event that the engagement teeth 226 of the cam member 204 are circumferentially aligned with the engagement teeth 208 of the locking member 202 upon release of the cam member 204 (thus, preventing the cam member 204 from being biased back into its locked axial position), the cam member 204 may be rotated slightly in one direction or the other relative to the locking member 202 until the engagement teeth 208, 226 are sufficiently offset from one another in the circumferential direction to allow the base portion 206 of the locking member 202 be at least partially received within the axial inset portion 228 of the cam member 204.

Figure 7:
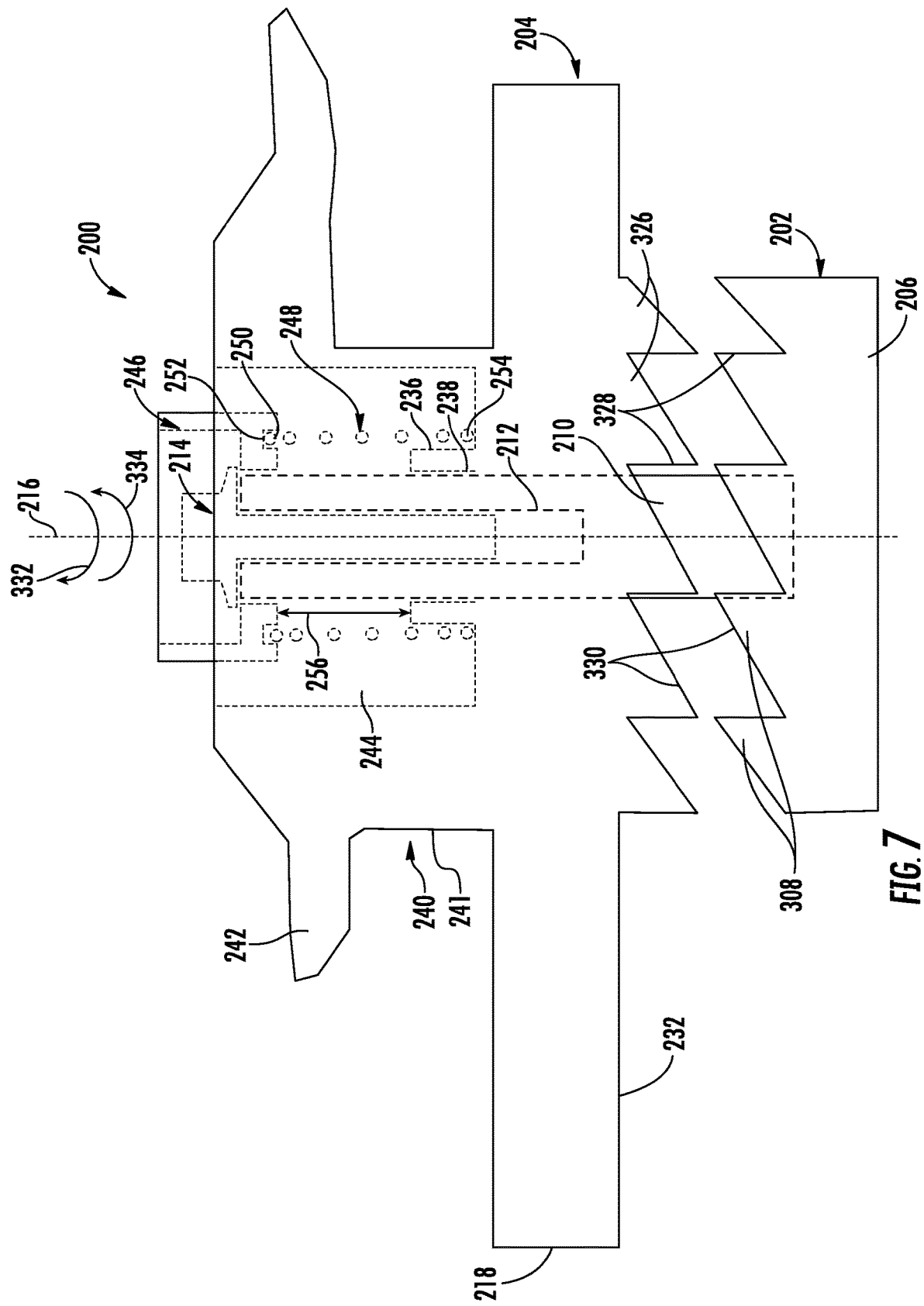
FIG. 7 illustrates a schematic view of another embodiment of a depth adjustment assembly suitable for use within the seed planting unit shown in FIG. 2.

Referring now to FIG. 7, a schematic, simplified view of another embodiment of a depth adjustment assembly 200 configured for use within a seed planting unit (e.g., the unit 108 shown in FIG. 2) of an agricultural implement is illustrated in accordance with aspects of the present subject matter. Specifically, FIG. 7 illustrates a different configuration for the engagement elements of the locking member 202 and the cam member 204. It should be appreciated that, except for the differing configuration for the engagement elements, the depth adjustment assembly 200 shown in FIG. 7 may otherwise have the same or a similar configuration to that described above with reference to FIGS. 3-6. Thus, for the sake of brevity, the description of the depth adjustment assembly 200 shown in FIG. 7 will be limited to distinguishing features of the engagement elements. One of ordinary skill in the art will appreciate that, but for the distinguishing features, the depth adjustment assembly 200 may function in the same or a similar manner to that described above with reference to FIGS. 3-6.

As shown in FIG. 7, unlike the radially extending engagement elements 208, 226 described above, both the locking member 202 and the cam member 204 include axially extending engagement elements. Specifically, in the illustrated embodiment, the locking member 202 includes a plurality of circumferentially spaced engagement teeth 308 extending axially outwardly from its base portion 206 in the direction of the cam member 204, with each engagement tooth 308 defining an axially tapered profile. Similarly, the cam member 204 includes a corresponding set of circumferentially spaced engagement teeth 326 projecting axially outwardly from its bottom surface 232 in the direction of the locking member 202, with each engagement tooth 326 of the cam member 204 defining an axially tapered profile that is generally complementary to the axially tapered profile of the engagement teeth 308 of the locking member 202. In such an embodiment, each engagement tooth 308, 326 may be formed by a first axially extending sidewall 328 and a second sidewall 330 that circumferentially extends from the first sidewall 328 and is sloped or tapered in the axial direction of the depth adjustment assembly 200 so that each set of engagement teeth 308, 326 generally has a "saw tooth" configuration. In such an embodiment, the second sidewall 330 of each engagement tooth 308, 326 may be configured to taper inwardly relative to its corresponding first sidewall 328 until it terminates at the first sidewall 328 of an adjacent engagement tooth 308, 326. It should be appreciated that, similar to the embodiment described above, the circumferential offset defined between adjacent first sidewalls 328 of each set of engagement teeth 308, 326 may generally correlate to a corresponding incremental adjustment of the penetration depth setting 124 for the opener 122.

By configuring the engagement elements of the locking member 202 and the cam member 204 in the manner shown in FIG. 7, the cam member 204 may be restricted or prevented from rotating in one direction relative to the locking member 202 when the cam member 204 is biased into engagement with the locking member 202 via the biasing force applied by the spring 248 (i.e., when the cam member 204 is disposed at its locked axial position relative to the locking member 202). Specifically, when the engagement teeth 326 of the cam member 204 are biased into engagement with the engagement teeth 308 of the locking member 202, the cam member 204 may be rotated in a first direction 332 relative to the locking member 202 to adjust the penetration depth setting 124 for the opener 122 (e.g., by either increasing or decreasing the penetration depth setting 124), but is restricted from rotating in the opposite direction relative to the locking member 202 (e.g., in a second direction 334) due to the circumferential engagement of the opposed first sidewalls 328 of the engagement teeth 308, 326. In such an embodiment, to allow the penetration depth setting 124 to be adjusted in the direction associated with rotation of the cam member 204 in the second direction 334, the cam member 204 may be moved axially away from the locking member 202 against the biasing force of the spring 248 (e.g., by the operator grasping the handle 240 and pulling the cam member 204 away from the locking member 202) until the cam member 204 is disposed at its unlocked axial position relative to the locking member 202 (i.e., until the engagement teeth 326 of the cam member 204 axially clear the engagement teeth 308 of the locking member 202). The cam member 204 may then be rotated freely relative to the locking member 202 in the second direction 334 (or in the first direction 332) to adjust the penetration depth setting 124 for the opener 122.

Figure 8:
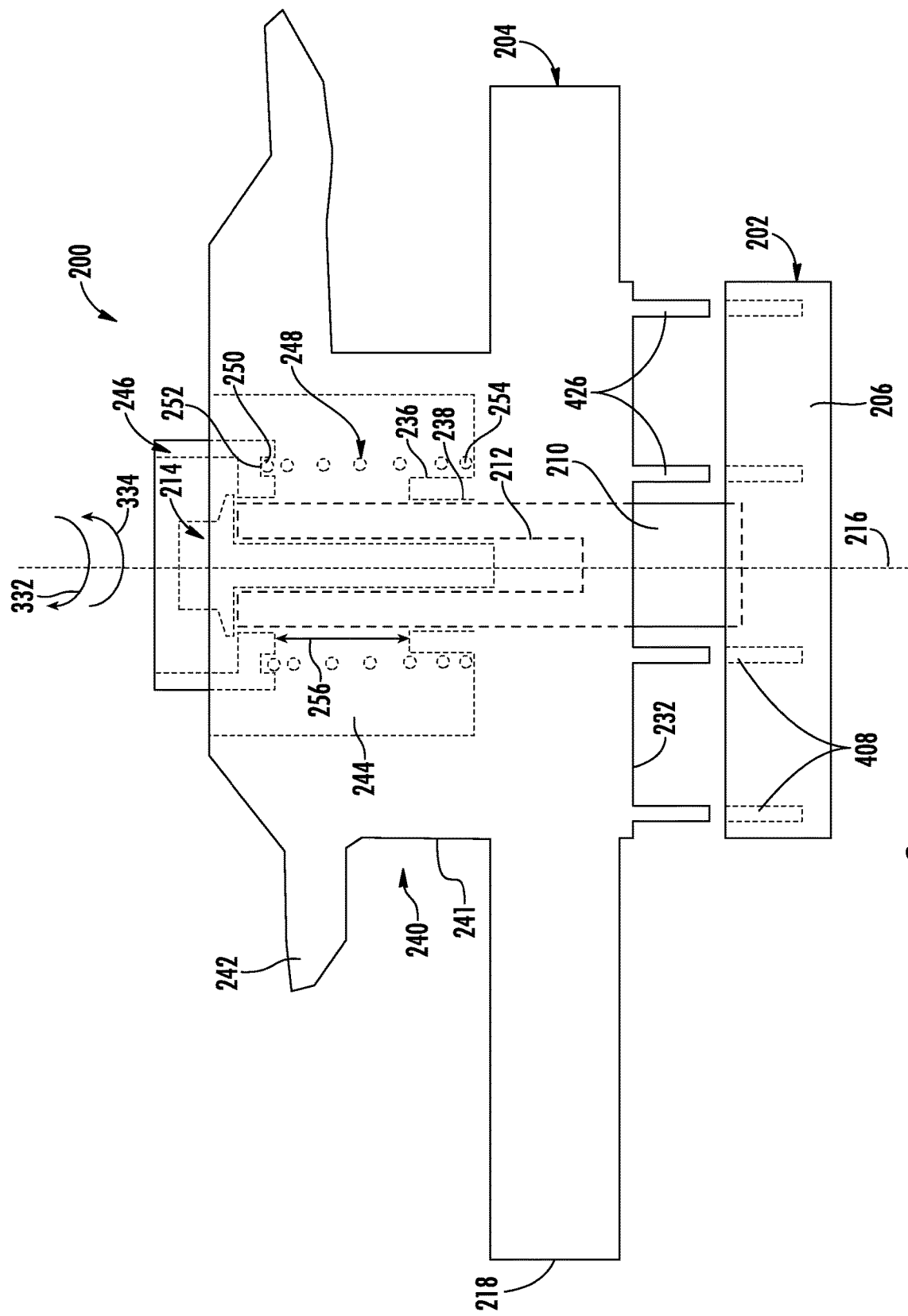
FIG. 8 illustrates a schematic view of yet another embodiment of a depth adjustment assembly suitable for use within the seed planting unit shown in FIG. 2.

Referring now to FIG. 8, a schematic, simplified view of a further embodiment of a depth adjustment assembly 200 configured for use with a seed planting unit (e.g., the unit 108 shown in FIG. 2) of an agricultural implement is illustrated in accordance with aspects of the present subject matter. Specifically, FIG. 8 illustrates yet another configuration for the engagement elements of the locking member 202 and the cam member 204. It should be appreciated that, except for the differing configuration for the engagement elements, the depth adjustment assembly 200 shown in FIG. 8 may otherwise have the same or a similar configuration to that described above with reference to FIGS. 3-7. Thus, for the sake of brevity, the description of the depth adjustment assembly 200 shown in FIG. 8 will be limited to the distinguishing features of the engagement elements. One of ordinary skill in the art will appreciate that, but for the distinguishing features, the depth adjustment assembly 200 may function in the same or a similar manner to that described above with reference to FIGS. 3-7.

As shown in FIG. 8, similar to the embodiment of the depth adjustment assembly 200 described above with reference to FIG. 7, both the locking member 202 and the cam member 204 include axially extending engagement elements 408, 426. However, unlike the axially tapered engagement teeth 308, 326 described above, the engagement elements correspond to axially extending projections or pins configured to be received within corresponding axially oriented openings. Specifically, in the illustrated embodiment, the cam member 204 includes a plurality of circumferentially spaced pins 426 extending outwardly from its bottom surface 232 in the direction of the locking member 202, with each pin 426 configured to be received within one of a plurality of circumferentially spaced, axially oriented openings 408 defined in the base portion 206 of the locking member 202. In such an embodiment, the circumferential spacing or offset defined between adjacent pins 426 of the cam member 204 and between adjacent openings 408 defined in the locking member 202 may generally correlate to a corresponding incremental adjustment of the penetration depth setting 124 for the opener 122. It should be appreciated that, as an alternative to the configuration shown in FIG. 8, the locking member 202 may be configured to include pins extending axially outwardly from its base portion 206. In such an embodiment, a set of corresponding axially oriented openings may be defined in the cam member 204 for receiving the pins of the locking member 202.

By configuring the engagement elements of the locking member 202 and the cam member 204 in the manner shown in FIG. 8, the cam member 204 may restrained from rotating in a manner that prevents the penetration depth setting 124 for the opener 122 to be adjusted when the cam member 204 is disposed at its locked axial position relative to the locking member 202 (i.e., when the pins 426 are received within the openings 408). In such an embodiment, to adjust the penetration depth setting 124, the cam member 204 may be moved axially away from the locking member 202 against the biasing force of the spring 248 (e.g., by the operator grasping the handle 240 and pulling the cam member 204 away from the locking member 202) until the cam member 204 is disposed at its unlocked axial position relative to the locking member 202 (e.g., the relative position shown in FIG. 8 at which the pins 426 are positioned outside the openings 408 and spaced axially apart from the base portion 206 of the locking member 202). The cam member 204 may then be rotated freely relative to the locking member 202 to adjust the penetration depth setting 124 for the opener 122.

Additionally, it should be appreciated that, in alternative embodiments, the engagement elements associated with the locking and cam members 202, 204 may have any other suitable configuration and/or may correspond to any other suitable elements and/or features that allow the disclosed depth adjustment assembly to generally function as described herein. For instance, in another embodiment, the engagement elements of the locking and cam members 202, 204 may correspond to or may be configured as opposing friction surfaces. For example, the locking member 202 may include one or more engagement elements corresponding to one or more friction surfaces (not shown), and the cam member 204 may include one or more engagement elements corresponding to one or more corresponding friction surfaces (not shown). In such an embodiment, the friction surfaces of the cam member 204 may be configured to frictionally engage the corresponding friction surfaces of the locking member 202 when the cam member 204 is biased against the locking member 202 into its locked axial position (i.e., such that the opposed friction surfaces abut or otherwise frictionally contact each other), with such frictional engagement of the friction surfaces providing a means to resist or prevent rotation of the cam member 204 relative to the locking member 202. As such, to adjust the penetration depth setting 124, the cam member 204 may be moved axially away from the locking member 202 against the biasing force of the spring 248 (e.g., by the operator grasping the handle 240 and pulling the cam member 204 away from the locking member 202) until the cam member 204 is disposed at its axially unlocked position relative to the locking member 202 (e.g., a position at which the friction surface of the cam member 204 is spaced axially apart from the friction surface of the locking member 202). The cam member 204 may then be rotated relative to the locking member 202 to adjust the penetration depth setting 124 for the opener 122. It should be appreciated that, in such an embodiment, the cam member 204 may be locked relative to the locking member 202 in any angular position, thereby permitting the penetration depth setting 124 for the ground engaging tool to be adjusted in non-discrete increments, such that the penetration depth setting 124 may be essentially infinitely adjustable.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A depth adjustment assembly for a seed planting unit of an agricultural implement, the seed planting unit including a ground engaging tool configured to penetrate a soil surface, a wheel support arm, and a wheel rotatably supported by the wheel support arm, the wheel configured to contact the soil surface to define a penetration depth setting for the ground engaging tool relative to the soil surface, the depth adjustment assembly comprising:
    a cam member configured to be rotated to adjust a vertical position of the wheel relative to the ground engaging tool, the cam member including a plurality of first engagement element;
    a locking member including a plurality of second engagement element configured to be selectively engaged with the plurality of first engagement element; and
    a biasing member configured to apply a biasing force against at least one of the cam member or the locking member to bias the cam member and the locking member together such that the first engagement element engages the second engagement element to maintain a rotational position of the cam member relative to the locking member,
    wherein, when the first engagement element is disengaged from the second engagement element, the cam member is configured to be rotated relative to the locking member to vary the penetration depth setting for the ground engaging tool, and wherein the first engagement element comprises a plurality of first axially tapered engagement teeth and the second engagement element comprises a plurality of second axially tapered engagement teeth; and
    the first and second axially tapered engagement teeth are configured to circumferentially engage one another when the cam and locking members are biased into engagement with each other via the biasing member.

2. The depth adjustment assembly of claim 1, wherein:
    the cam member defines an outer cam surface defining a cam profile; and
    a portion of the wheel support arm is configured to contact the outer cam surface such that rotation of the cam member relative to the locking member adjusts the vertical position of the wheel relative to the ground engaging tool.

3. The depth adjustment assembly of claim 1, wherein the cam member is movable axially between a first axial position, at which the cam member is configured to be rotated relative to the locking member, and a second axial position, at which the first engagement elements are engaged with the second engagement elements to maintain the rotational position of the cam member relative to the locking member.

4. The depth adjustment assembly of claim 1, wherein the cam member is movable axially between a first axial position, at which the cam member is rotatable relative to the locking member in both a first direction and an opposite, second direction, and a second axial position, at which the cam member is rotatable relative to the locking member in the first direction and is restrained from rotation relative to the locking member in the second direction.

5. The depth adjustment assembly of claim 1, wherein the locking member is fixed in position relative to the cam member.

6. The depth adjustment assembly of claim 1, further comprising a holding member coupled to the locking member, wherein the biasing member is configured to be compressed between the holding member and the cam member.

7. A seed planting unit for an agricultural implement, the seed planting unit comprising:
    a support member;
    a ground engaging tool supported by the support member and configured to penetrate a soil surface;
    a wheel support arm pivotally coupled to the support member;
    a wheel rotatably supported by the wheel support arm, the wheel configured to contact the soil surface to define a penetration depth setting for the ground engaging tool relative to the soil surface; and
    a depth adjustment assembly including a cam member configured to be rotated to adjust a vertical position of the wheel relative to the ground engaging tool, the depth adjustment assembly further comprising a locking member and a biasing member, the cam member including a plurality of first engagement element and the locking member including a plurality of second engagement element, the biasing member being configured to apply a biasing force against at least one of the cam member or the locking member to bias the cam member and locking member together such that the first engagement element engages the second engagement element to maintain a rotational position of the cam member relative to the locking member,
    wherein, when the first engagement element is disengaged from the second engagement element, the cam member is configured to be rotated relative to the locking member to vary the penetration depth setting for the ground engaging tool,
    wherein the cam member is movable axially between a first axial position, at which the cam member is rotatable relative to the locking member in both a first direction and an opposite, second direction, and a second axial position, at which the cam member is rotatable relative to the locking member in the first direction and is restrained from rotation relative to the locking member in the second direction.

8. The seed planting unit of claim 7, wherein:
one of the first engagement element or the second engagement element comprises a plurality of circumferentially spaced engagement elements; and
a circumferential offset defined between adjacent engagement elements of the plurality of engagement elements correlates to an incremental adjustment of the penetration depth setting with rotation of the cam member relative to the locking member.

9. The seed planting unit of claim 7, wherein the cam member is movable axially between a first axial position, at which the cam member is configured to be rotated relative to the locking member, and a second axial position, at which the first engagement elements are engaged with the second engagement elements to maintain the rotational position of the cam member relative to the locking member.

10. The seed planting unit of claim 9, wherein:
one of the plurality of first engagement element or the plurality of second engagement element comprises a plurality of radially inwardly extending engagement elements and the other of the plurality of first engagement element or the plurality of second engagement element comprises a plurality of radially outwardly extending engagement elements; and
the radially inwardly extending engagement elements are configured to circumferentially engage the radially outwardly extending engagement elements when the cam member is disposed at the second axial position.

11. The seed planting unit of claim 10, wherein:
the radially inwardly extending engagement elements comprise a plurality of first engagement teeth extending radially inwardly from a portion of the cam member; and
the radially outwardly extending engagement elements comprise a plurality of second engagement teeth extending radially outwardly from a portion of the locking member.

12. The seed planting unit of claim 9, wherein:
one of the first engagement element or the second engagement element comprises a plurality of axially extending engagement elements and the other of the first engagement element or the second engagement element comprises an element defining a plurality of axially extending openings; and
the axially extending elements are configured to be received within the axially extending openings when the cam member is disposed at the second axial position.

13. The seed planting unit of claim 7, wherein:
the first engagement element comprises a plurality of first axially extending engagement elements and the second engagement element comprises a plurality of second axially extending engagement elements;
the first and second axially extending elements are configured to circumferentially engage one another when the cam member is disposed at the second axial position.

14. The seed planting unit of claim 13, wherein:
the first axially extending engagement elements comprise a plurality of first axially tapered engagement teeth projecting axially outwardly from the cam member toward the locking member; and
the second axially extending engagement elements comprise a plurality of second axially tapered engagement teeth projecting axially outwardly from the locking member towards the cam member.

15. The seed planting unit of claim 7, wherein:
the cam member defines an outer cam surface defining a cam profile;
a portion of the wheel support arm is configured to contact the outer cam surface such that rotation of the cam member relative to the locking member adjusts the vertical position of the wheel relative to the ground engaging tool.

* * * * *